United States Patent Office 2,955,019
Patented Oct. 4, 1960

2,955,019

PROCESS FOR SELECTIVE EXTRACTION OF NITRATES FROM AQUEOUS NITRATE-SULFATE SOLUTIONS

Charles T. Dickert, Levittown, and Albert F. Preuss, Jr., Hatboro, Pa., assignors to Rohm & Haas Company, Philadelphia, Pa., a corporation of Delaware No Drawing. Filed Mar. 20, 1957, Ser. No. 647,182

10 Claims. (Cl. 23—14.5)

This invention relates to a process for selectively extracting nitrates from aqueous nitrate-sulfate solutions. A principal object of the invention is to make possible the recovery and re-use of expensive nitrates from nitrate-sulfate solutions. Such recovery and re-use is of especial value and importance in the uranium processing industry in which it has previously been the practice to discard nitrates after they have been used as eluting agents: (a) in such processing by means of columns of ion-exchange resins; and (b) in the "resin-in-pulp" uranium recovery process. Another, equally important application is in connection with trade wastes as from nitration reactions, in which it has previously been the practice to discard the wastes "as are" or to neutralize them before allowing them to wash out to a river or the sea. The present invention makes possible the recovery and re-use of the nitrates by means of a liquid-liquid extraction process utilizing high molecular weight water-insoluble amines.

Because of the current interest in and importance of acquiring large quantities of uranium, and further because of the existence of numerous economic factors which tend to force the cost upwards, anything which will contribute to a lowering of uranium processing costs is of extreme interest to the industry. Consider, for example, one major process in which uranium is leached from its ore by means of sulfuric acid. The resulting solution is filtered and passed through a column of ion-exchange resin on the particles of which the uranium becomes adsorbed. To elute the uranium from the resin particles a solution of nitric acid and ammonium nitrate is employed, said solution normally being approximately one molar in nitrate. As a result of this elution essentially all exchange sites (i.e. resin particles which exchange their ions for ions in the solution passed through the column) are occupied by nitrate ions.

Compared to other eluants which might be employed, such as chlorides, the nitrates are quite expensive. Originally, nitrates were chosen over chlorides for this function by uranium processors because of their greater uranium-eluting ability and because they are more readily available. Subsequently, another important advantage possessed by the nitrates was discovered when it was found that they removed polythionates from the ion-exchange resin. Polythionate is a poison which results when uranium is leached by sulfuric acid and which generally is unaffected when chlorides are employed as the eluant. The value of removing polythionates lies in the fact that their presence in ion-exchange resins has frequently been found to lead to difficulty in hydrometallurgical applications of the resin.

Since a considerable volume of ion-exchange resins is employed in each plant where uranium is being extracted thereby, and elutions with nitrate solutions are frequent, it has been recognized by the uranium processing industry that considerable savings could accrue by recovering and reusing the nitrates. As an example of the extent of the problem, in a single uranium elution cycle, in which was employed a column containing 200 cubic feet of the ion-exchange resin, it has been found that nitrate losses of from 800 to 1500 pounds are common.

Some of the nitrate eluant, namely that which is in the solution surrounding the resin particles and filling the resin interstices, can be recovered by washing down the resins with water. Some of the nitrate eluant is adsorbed by the resin exchange sites, but some of it is displaced by the sulfate in the pregnant leach liquor (resulting from leaching the uranium ore with sulfuric acid) as more of the latter is passed through the resin columns. However, the bulk of the nitrate would not be recovered by either of these means and it has been proposed that this bulk should be recovered by passing fresh sulfuric acid through the column. One drawback has been that the resulting solution will contain both nitric and sulfuric acids. The separating out of the nitric acid from this solution hitherto has been incapable of accomplishment on a sound, economically feasible basis.

One of the ways known to the prior art for separating nitrate from sulfuric acid solutions was to precipitate out the sulfate with lime. But this caused problems in that the uranium eluting solution balance was upset, an evaporation apparatus and step was required, and an increased amount of sulfuric acid was made necessary for use in eluting more nitrate from the ion-exchange resin. The use of lime causes another objectionable situation in that a slight excess will bring about the precipitation of calcium sulfate which will clog the pipelines in a commercial processing plant. Another of the prior art techniques for effecting this separation, which had an advantage over the one just described in that it made possible the reuse of sulfuric acid, was to pass the solution through a column of weakly basic ion-exchange resin such as the resin described in U.S. Patent No. 2,591,574. However, this method was objectionable because it required the use of an ammonia recovery still.

The present invention eliminates the just described and other objectionable features of the prior art processes for recovering nitrates from solutions with sulfuric acid. The improvement consists in selectively extracting nitric acid from such solutions by means of high molecular weight amines dissolved in a water insoluble diluent, and in accordance with the steps in the examples to be given later on. By "high molecular weight amines" is meant those amines having a molecular weight of at least 185, as represented, for example, by t-dodecylamine. Further embraced by the term are primary, secondary, and tertiary amines, and quaternary ammonium compounds.

The unique process was tested and found to work successfully with compositions such as are found in typical uranium plant conditions wherein the uranium ore is processed as aforesaid, namely by leaching with sulfuric acid, filtering and adsorbing the uranium on ion-exchange resins and eluting the uranium with nitric acid-ammonium nitrate solution. At this point, the nitrates were eluted with sulfuric acid. Such a step, as was indicated above, could not have been utilized by uranium processors in the past because it was not known how to separate out the nitrates from the resulting nitrate-sulfate solution on an economically sound basis. The ion-exchange resin employed in the columns or beds was, in this instance, the chloride form of that described in U.S. Patent No. 2,591,573, although, of course, many other resins can be used for the same purpose. The resin in the columns was converted to the nitrate form by passing over it the nitrate eluant which conventionally is used in most commercial plants for eluting uranium which had been adsorbed by the resin. This eluant consisted of:

0.33 N $HNO_3$
0.67 N $NH_4NO_3$
0.50 N $(NH_4)_2SO_4$

Enough of this eluant was passed through the columns until the effluent was found, upon analysis, to contain no chloride, thus indicating that essentially all the resin had been converted to the nitrate form and the chloride had substantially all been removed therefrom.

Immediately following the conversion of the resin to the nitrate form, sulfuric acid was passed through the columns as explained above. In one set of experiments 10% sulfuric acid was employed; in another set of tests a 20% concentration of the acid was used. The choice of either one of these concentrations, or even others, is not material to the present invention. As the percentage of acid is increased there is a comparable increase in efficiency of nitrate recovery from the resin, but workers in the field have to determine the economic balance between this additional efficiency on one hand in comparison with the cost of using more acid on the other. When it comes to separating out and recovering the nitrate from the sulfuric acid solution the present invention appears to function with almost equal efficiency at low or high sulfuric concentrations, as will be seen from data to be presented later.

The effluent containing nitrates and sulfuric acid was then treated in accordance with the present invention. The first step in the treatment consisted of mixing the effluent in a separatory device such as a separatory funnel or a mixer-settler with a water-insoluble amine having a high molecular weight. Any concentration of amines appeared suitable, but a concentration of 10% weight/volume of amine in a kerosene diluent was employed in most of the tests. Of course, the volume of the extractant employed would vary with the actual amount of amine present. Another variable, as may be expected, was found to be the ratio of the amount of amine to an equivalent amount of nitrate, e.g., a 1:1 equivalent ratio of each was found to result in an average single stage extraction of approximately 90% of the nitrate, whereas increased amounts of the amine up to a certain excess (which amount varies with the amine used) will make possible complete nitrate extraction.

After the effluent and amine were thoroughly mixed together the solution was allowed to stand until two layers, the organic and the aqueous, settled out. The aqueous layer, which consists primarily of sulfuric acid, was set aside for further use either to leach uranium from its ore, or to elute nitrate from a resin. The next step was to recover the nitric acid adsorbed by the amine. This was done by stripping the acid from the organic phase with basic solutions such as magnesium oxide, ammonium hydroxide, sodium hydroxide, etc. to form nitrate salt solutions. The stripping solutions thus produced were then capable of further use, after acidification with nitric or sulfuric acid, for elution of uranium. Thus, the present invention has made possible a batch-wise process or a complete, practical cyclic process for recovering uranium that has been leached from its ore with sulfuric acid. With respect to the invention's use as part of a cyclic process, an important feature is that nitrate solutions used in eluting the uranium from columns of ion-exchange resins can be almost completely recovered and reused in further uranium elutions. Moreover, this recovery of nitrates from sulfuric acid solutions affords advantages over prior art techniques in that the uranium eluting solution balance is not upset as it is when the sulfate is precipitated out with lime, nor is it necessary to recover ammonia with all the attendant disadvantages of the extra step and cost involved thereby.

EXAMPLES OF NITRATE RECOVERY FROM NITRATE-SULFATE SOLUTIONS IN URANIUM PROCESSING BY MEANS OF ION-EXCHANGE COLUMNS

Following are a number of examples in which the present invention was employed to separate nitrates from nitrate-sulfate solutions collected as effluents in the ion-exchange resin column means for processing uranium. To illustrate the scope of the invention, two different representatives of primary, secondary, and tertiary amines, and quaternary ammonium compounds were utilized as the nitrate separator and extractant.

PART A.—ELUTION OF NITRATE FROM ION-EXCHANGE RESIN COLUMNS WITH SULFURIC ACID

Into each of two glass columns having a one inch inside diameter there was placed 200 ml. of fresh ion-exchange resin, in its chloride form, of the type disclosed in U.S. Patent No. 2,591,573. Two liters of a nitrate eluant, consisting of 0.33 N $HNO_3$, 0.67 N $NH_4NO_3$, and 0.5 N $(NH_4)_2SO_4$, were passed through the column. The effluent from each was then tested for chloride and found to be negative. Immediately thereafter 10% $H_2SO_4$ was passed through one column and 20% $H_2SO_4$ was passed through the other, both at a rate of 0.3 gal./ft.$^3$/min. for a period of two hours. The effluent from each column was tested throughout to determine whether the nitrate was substantially all eluted, this being done by determining the concentrations of the nitrate and sulfuric acid in a number of effluent samples from each column. When the concentration of sulfuric acid in the effluent was about equal to the sulfuric acid concentration in the eluant, the elutions were stopped.

PART B.—NITRATE EXTRACTION FROM SULFURIC ACID SOLUTIONS

The final effluent from each column, which was found to have a nitrate concentration of about 0.3 N in both cases, was placed in an individual 60 ml. cylindrical separatory funnel. To this aqueous solution in each funnel was added an equivalent amount of an extractant consisting of a 0.2 M solution of an amine in a kerosene diluent. (In the cases where the quaternary ammonium compounds were employed, since they are not soluble in kerosene, chloroform was used as the diluent.) In lieu of kerosene other diluents may be employed such as chloroform (already mentioned), benzene, toluene, xylene, heptane, light or heavy refined mineral oils, etc. The solutions in the funnels were equilibrated by shaking them thoroughly and then allowing them to stand until the organic layer separated out from the aqueous layer (or raffinate) and was drawn off. The normality of the nitric acid in the raffinate was obtained and compared with the concentration of nitrate which underwent the amine extraction treatment to determine the percentage of nitric acid which had been extracted. Tables I–IV, which lists these percentages, will be seen to record the results of the tests when two different amines of each type (i.e., primary, secondary, etc.) were employed. In each instance, it will be noted, there is data for the column in which a 10% $H_2SO_4$ solution was utilized, and also data for the 20% $H_2SO_4$ solution, in order to provide a basis for comparing the effectiveness of the present invention in separating nitrates from solutions having different concentrations of sulfates present.

Table I

NITRATE EXTRACTION FROM SULFURIC ACID USING PRIMARY AMINES

| Amine | $H_2SO_4$ | $HNO_3$ | $HNO_3$ in Raffinate | Percent $HNO_3$ Extracted |
|---|---|---|---|---|
| A—Mixture No. 1 [1] | (10%) 2N | 0.284 N | 0.197 | 30.6 |
|  | (20%) 4N | 0.287 N | 0.180 | 37.3 |
| B—Mixture No. 2 [2] | (10%) 2N | 0.284 N | 0.108 | 62.0 |
|  | (20%) 4N | 0.287 N | 0.131 | 54.4 |

[1] Mixture No. 1 indicates a commercially available mixture of amines principally consisting of t—$C_nH_{2n+1}NH_2$ where $n=12$ to 15.
[2] Mixture No. 2 indicates a commercially available mixture of amines principally consisting of t—$C_nH_{2n+1}NH_2$ where $n=18$ to 24.

Table II
NITRATE EXTRACTION FROM SULFURIC ACID USING SECONDARY AMINES

| Amine | $H_2SO_4$ | $HNO_3$ | $HNO_3$ in Raffinate | Percent $HNO_3$ Extracted |
|---|---|---|---|---|
| A—Dodecylbenzyl t-dodecylamine | (10%) 2N | 0.284 N | 0.034 | 88.0 |
|  | (20%) 4N | 0.287 N | 0.063 | 78.2 |
| B—Dodecenyl t-dodecylamine | (10%) 2N | 0.306 N | 0.050 | 83.7 |
|  | (20%) 4N | 0.310 N | 0.058 | 81.3 |

Table III
NITRATE EXTRACTION FROM SULFURIC ACID USING TERTIARY AMINES

| Amine | $H_2SO_4$ | $HNO_3$ | $HNO_3$ in Raffinate | Percent $HNO_3$ Extracted |
|---|---|---|---|---|
| A—Tridodecenyl | (10%) 2N | 0.284 N | 0.085 | 70.1 |
|  | (20%) 4N | 0.306 N | 0.086 | 72.3 |
| B—Dodecylbenzyl di-n-butyl | (10%) 2N | 0.284 N | 0.065 | 77.2 |
|  | (20%) 4N | 0.310 N | 0.114 | 63.2 |

Table IV
NITRATE EXTRACTION FROM SULFURIC ACID USING QUATERNARY AMMONIUM COMPOUNDS

| Amine | $H_2SO_4$ | $HNO_3$ | $HNO_3$ in Raffinate | Percent $HNO_3$ Extracted |
|---|---|---|---|---|
| A—Dodecenyl trimethyl ammonium chloride | (10%) 2N | 0.306 N | 0.000 | 100 |
|  | (20%) 4N | 0.310 N | 0.000 | 100 |
| B—[3] | (10%) 2N | 0.306 N | 0.000 | 100 |
|  | (20%) 4N | 0.310 N | 0.000 | 100 |

[3] Poly(metamethylparadodecylbenzyl)dimethyl-γ-(acrylamido) propylammonium chloride.

The nitric acid adsorbed by the amine from the $H_2SO_4$ solution was recovered from the organic phase by stripping with a basic solution. Various solutions were tried with different samples of the acid amine; in each pair of tests one sample was treated with $NH_4OH$ and the other with NaOH. The results are indicated in Tables V–VIII. In each case the sample was mixed with the base to form neutral or slightly acidic nitrate salt solutions.

Table V
NITRATE STRIPPING FROM PRIMARY AMINES WITH BASIC SOLUTIONS

| Amine | Strippant | meq. of Base/meq. of Amine $HNO_3$ | Percent $HNO_3$ Stripped |
|---|---|---|---|
| A—Mixture No. 1 [1] | 0.3N $NH_4OH$ | 1.5 | 44.2 |
|  | 0.3N NaOH | 1.5 | 38.8 |
| B—Mixture No. 2 [2] | 0.3N $NH_4OH$ | 1.5 | 92.7 |
|  | 0.3N NaOH | 1.5 | 89.2 |

[1] Mixture No. 1 indicates a commercially available mixture of amines principally consisting of t—$C_nH_{2n+1}NH_2$ where $n=12$ to 15.
[2] Mixture No. 2 indicates a commercially available mixture of amines principally consisting of t—$C_nH_{2n+1}NH_2$ where $n=18$ to 24.

Table VI
NITRATE STRIPPING FROM SECONDARY AMINES WITH BASIC SOLUTIONS

| Amine | Strippant | meq. of Base/meq. of Amine $HNO_3$ | Percent $HNO_3$ Stripped |
|---|---|---|---|
| A — Dodecylbenzyl t-dodecylamine | 0.3N $NH_4OH$ | 1.5 | 44.2 |
|  | 0.3N NaOH | 1.5 | 38.8 |
| B — Dodecenyl t-dodecylamine | 0.3N $NH_4OH$ | 1.5 | 92.7 |
|  | 0.3N NaOH | 1.5 | 89.2 |

Table VII
NITRATE STRIPPING FROM TERTIARY AMINES WITH BASIC SOLUTIONS

| Amine | Strippant | meq. of Base/meq. of Amine $HNO_3$ | Percent $HNO_3$ Stripped |
|---|---|---|---|
| Tridodecenyl | 0.3N $NH_4OH$ | 1.5 | 84.3 |
|  | 0.3N NaOH | 1.5 | 72.3 |
| Dodecylbenzyl di-n-butyl | 0.3N $NH_4OH$ | 1.5 | 53.8 |
|  | 0.3N NaOH | 1.5 | 57.9 |

Table VIII
NITRATE STRIPPING FROM QUATERNARY AMMONIUM COMPOUNDS WITH BASIC SOLUTIONS

| Compound | Strippant | meq. of Base/meq. of Compound $NO_3$ | Percent $NO_3$ Stripped |
|---|---|---|---|
| A—Dodecenyl trimethyl ammonium chloride | 0.3N $NH_4OH$ | 1.5 | 3.1 |
|  | 0.3 N NaOH | 1.5 | 2.1 |
| B—[3] | 0.3N $NH_4OH$ | 1.5 | 2.4 |
|  | 0.3N NaOH | 1.5 | 2.0 |

[3] Poly(metamethylparadodecylbenzyl)dimethyl-γ-(acrylamido) propylammonium chloride.

It will be noted from Tables I–IV that values for percent $HNO_3$ extracted are comparatively lower for the primary amines than for the others. This is due primarily to the solubility of the amine salts in the aqueous phase. As the equivalent weights of the amines increase the solubilities of the amine salts decrease and the nitric acid extraction increases.

It is of further interest to note that, although the quaternary ammonium compounds effected a 100% extraction of the nitrate (Table IV), it was not possible to strip a sufficient percentage of the nitrate for the amine to make recovery of the nitrate by this means commercially feasible. However, this means of extracting nitrate from sulfuric acid solutions is far more useful in any application where the main object is to extract the nitrate from nitrate-sulfate solutions, and there is no particular requirement to salvage the nitrate as such. The quaternaries, moreover, have a special advantage over the other amines in that they can extract the nitrates from neutral or alkaline solutions without having to first make the system acidic.

The data in the above tables pertains to the separation of nitrates from nitrate-sulfate solutions derived in the course of processing uranium by means of columns of ion-exchange resins. Such solutions are strongly acid per se, and the extraction of the nitrate by means of high-molecular weight amines in accordance with the present invention is thereby enabled to be carried out directly as described above. There are some situations, however, where nitrate-sulfate solutions are obtained which are essentially neutral. An example of this is in the so-called "Resin-in-Pulp" uranium recovery process (cf. "The Resin-in-Pulp Process for Recovery of Uranium," by R. F. Hollis and C. K. McArthur, a paper presented at the International Conference on the Peaceful Uses of Atomic Energy (Paper A/Conf. 8/P/526 U.S.A. 6 July 1955). The solutions which result from that process (which up to now have had to be discarded in commercial practice) essentially comprise the following components (taken from an actual run which may be considered to be typical):

$Cl^- = 0.0048$ N
$NO_3^- = 0.54$ N
$SO_4^{--} = 1.00$ N
$Mg^{++} + NH_4^+ = 1.54$ N
pH = 6.8
$H^+ = 0.0016$ N

Only a small percentage of nitrates can be extracted directly from such neutral salt solutions by means of primary, secondary, and tertiary high molecular weight amines. The quaternary ammonium compounds, by comparison, operate very efficiently with such solutions and directly extract large percentages of nitrates. However, the primary, secondary and tertiary amines can also be utilized to accomplish a commercially feasible extraction. All that is necessary is to acidify the solution before the amine is added (as illustrated in Table IX), or to add acid to the amine (as in Table X) before it is used to extract the nitrates from the nitrate-sulfate solution.

Table IX

NEUTRAL NITRATE-SULFATE SOLUTION ACIDIFIED BEFORE AMINE IS ADDED

In these examples the amine, in $SO_4^=$—$HSO_4^-$ form, was employed to contact the aqueous solution whose components were listed above. The amine used was an organic phase, 10% weight/volume (0.26 M) dodecenyl t-dodecylamine, the same as in Table II–B above.

| Vol. orig. | Vol. Aq. | meq. Amine/ meq. $NO_3$ | N $NO_3$ in Raffinate | Percent $NO_3$ Extracted |
|---|---|---|---|---|
| 50 | 50 | 0.48 | 0.35 | 35.2 |
| 50 | 12.5 | 1.9 | 0.003 | 99.4 |
| 41 | 20 | 0.99 | 0.094 | 82.6 |
| 43 | 20 | 1.03 | 0.079 | 85.4 |
| 45 | 20 | 1.08 | 0.064 | 88.1 |

Table X

In these examples $H_2SO_4$ was added to the neutral bleed liquor and a solution of free amine in kerosene was used to extract the $HNO_3$. The amine used was an organic phase, 10% weight/volume (0.26 M) dodecenyl t-dodecylamine, the same as in Table II–B above. The ratio meq. amine/meq. $NO_3 = 1.03$.

| Vol. org. | Vol. Aq. | H+N of Aq. | N $NO_3$ in Raffinate | Percent $NO_3$ Extracted |
|---|---|---|---|---|
| 43 | 20 | 0.40 | 0.160 | 70.3 |
| 43 | 20 | 0.54 | 0.074 | 86.3 |
| 43 | 20 | 0.70 | 0.069 | 87.2 |

The applications and data set forth above pertain to uranium processing operations. As earlier mentioned, there is an equally important field of use for the present invention in the salvaging of nitrates from trade-wastes, as from nitration reactions. One example is in connection with the manufacture of nitrocellulose during which large quantities of water are used which become contaminated with nitric and sulfuric acids. In one plant where from 2000 to 10,000 gallons per minute of acid waste water is reported (B. W. Dickerson and R. M. Brooks, "Neutralization of Acid Wastes," 42 J. Ind. and Eng. Chem. 599, April 1950), to be discharged, it is estimated that from 100 to 500 tons of nitrate are lost each day. By employment of the present invention, and recycling the $NH_4OH$ stripping solution, it is possible to take the nitrate out as $NH_4NO_3$, building it up to a very large concentration. To illustrate, in one case a 50% weight/volume of ammonium nitrate solution with some added ammonia was used as a starter, and it was found possible to strip the amine with the same efficiency as that obtained by starting with ammoniacal water. Illustrative of the value of this application is the fact that ammonium nitrate, in solutions containing concentrations of 50–80%, is currently being marketed as an aqueous fertilizer.

From the foregoing it will be apparent that the present invention has made possible the recovery and re-use of expensive nitrates that otherwise would be lost as a result of having become mixed with solutions of sulfates in many industrial processes. This recovery is economically practical and the savings far outweigh the expense of the materials, equipment and time which are required therefor. From the examples given it will be obvious that the invention is capable of wide application. Further, it should be apparent that there may be employed as the extractant any high molecular weight amine, as same has herein been defined, and not merely those which have herein been specifically mentioned for illustrative purposes. Likewise, other bases besides those indicated are suitable as the stripping agent. Because of this wide latitude with which our invention may readily be practiced by those skilled in the art we believe it reasonable that we be not restricted in coverage by virtue of any omissions from the foregoing specification, but only by the purview of the appended claims.

We claim:

1. A cyclic process for eluting uranium which has been leached from its ore with sulfuric acid, filtered and adsorbed on ion-exchange resins, and for recovering and reusing the nitrates used to elute the uranium, said process comprising, first passing a nitric acid-ammonium nitrate solution through the ion-exchange column whereby to displace the uranium on the resin with nitrate ions and make possible the collection of uranium in the effluent of this step, then passing sulfuric acid through the column whereby to displace the nitrate ions with sulfate ions, next collecting the nitric acid effluent from the sulfuric acid treatment step and mixing it in a separatory apparatus with a water insoluble amine from the group consisting of primary, secondary, and tertiary amines, and quaternary ammonium compounds, each member of said group having a molecular weight of at least about 185, whereby the nitric acid is adsorbed on the amine, then separating out the organic layer and mixing it with a base to form a nitrate salt solution, and acidifying the resulting solution with an acid selected from the group consisting of nitric and sulfuric acids, whereby to make that solution suitable for further use in eluting uranium from ion-exchange resins on which it may have been adsorbed.

2. The process of claim 1 in which the amine is a mixture of amines principally comprising t—$C_nH_{2n+1}NH_2$ in which $n$ is a number taken from one of two groups: 12 to 15 and 18 to 24.

3. The process of claim 1 in which the amine is dodecylbenzyl t-dodecylamine.

4. The process of claim 1 in which the amine is dodecenyl t-dodecylamine.

5. The process of claim 1 in which the amine is tridodecenyl amine.

6. The process of claim 1 in which the amine is dodecenyl trimethyl ammonium chloride.

7. In a process for selectively extracting nitrates from a substantially neutral aqueous solution containg the following components: $Cl^-$, $NO_3^-$, $SO_4^=$, $Mg^{++}$, $NH_4^+$, the step which comprises adding $H_2SO_4$ in order to acidify the solution prior to the separation of the nitrates from the sulfates by equilibrating the solution with a water-insoluble amine having a molecular weight of at least about 185.

8. In a process for selectively extracting nitrates from a substantially neutral aqueous solution containg the following components: $Cl^-$, $NO_3^-$, $SO_4^=$, $Mg^{++}$, the step which comprises adding $H_2SO_4$ in order to acidify a water-insoluble amine having a molecular weight of at least about 185 prior to using it to separate the nitrates from the sulfates by equilibrating the solution with the amine.

9. A cyclic process for extracting nitrates from aqueous trade wastes containing nitrates and sulfates, and building up the concentration thereof, which process comprises, continuously mixing the aqueous wastes in a container of the separatory funnel category together with a water-insoluble amine having a molecular weight of at least about 185; continuously separating out the organic layer which comprises the amine having nitrates adsorbed thereon, continuously stripping the nitrates from the amine by mixing a nitrate-stripping solution of $NH_4OH$ with the organic layer to form $NH_4NO_3$, and recycling the resulting solution which contains $NH_4OH$ and $NH_4NO_3$ until the concentration of $NH_4NO_3$ is built up to a desired level.

10. The process of claim 9 in which, after the nitrate-stripping solution of $NH_4OH$ is mixed with the organic layer to form $NH_4NO_3$, the solution which results is fortified by the further addition of $NH_4OH$ preparatory to recycling it to effect further stripping of the nitrate from the amine.

References Cited in the file of this patent

Smith et al.: "Journal of Society of Chemical Industries" (London), vol. 67, pages 48–51, February 1948.

Brown et al.: U.S. Atomic Energy Commission Document AECD–4142, June 9, 1954, declassified Jan. 11, 1956, pages 66–71, 78–87.

Ross: U.S. Atomic Energy Commission Document TID–7508, declassified Dec. 15, 1955, pages 54–60.

Hollis et al.: "Peaceful Uses of Atomic Energy," United Nations, vol. 8 (1956), pages 54–63.